H. R. STRATFORD.
METHOD OF AND APPARATUS FOR MAKING HOLLOW RUBBER ARTICLES.
APPLICATION FILED OCT. 9, 1919.

1,430,699.

Patented Oct. 3, 1922.
2 SHEETS—SHEET 1.

Inventor
Herbert R. Stratford
By Bates & Mueklin,
Attys.

H. R. STRATFORD.
METHOD OF AND APPARATUS FOR MAKING HOLLOW RUBBER ARTICLES.
APPLICATION FILED OCT. 9, 1919.
1,430,699.
Patented Oct. 3, 1922.
2 SHEETS—SHEET 2.
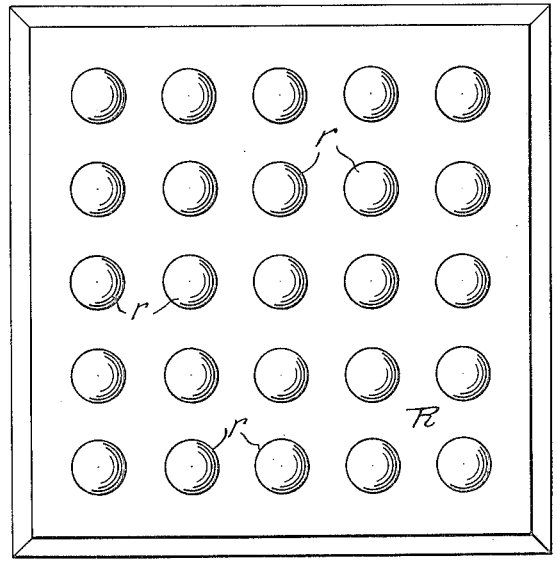
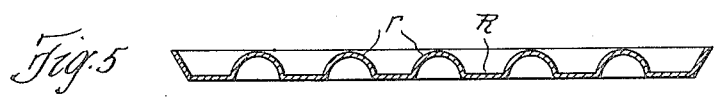
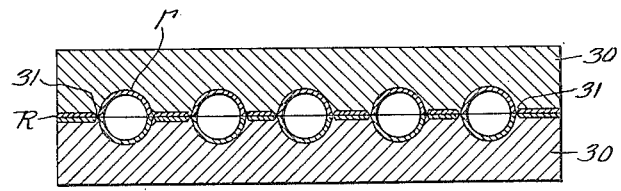
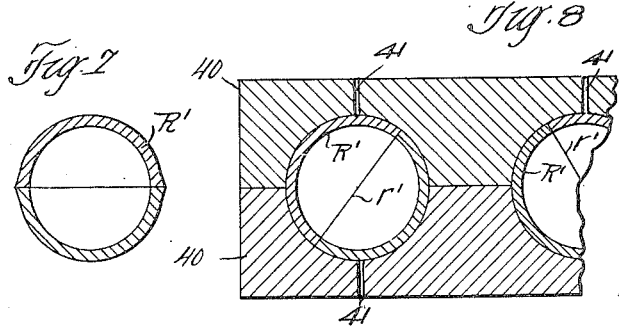
Inventor
Herbert R. Stratford,
By Baker & Macklin
Attys.

Patented Oct. 3, 1922.

1,430,699

UNITED STATES PATENT OFFICE.

HERBERT R. STRATFORD, OF CLEVELAND, OHIO, ASSIGNOR, BY MESNE ASSIGNMENTS, TO PARAMOUNT RUBBER CONSOLIDATED, INC., OF PHILADELPHIA, PENNSYLVANIA, A CORPORATION OF DELAWARE.

METHOD OF AND APPARATUS FOR MAKING HOLLOW RUBBER ARTICLES.

Application filed October 9, 1919. Serial No. 329,498.

*To all whom it may concern:*

Be it known that I, HERBERT R. STRATFORD, residing at Cleveland, in the county of Cuyahoga and State of Ohio, have invented a certain new and useful Improvement in Method of and Apparatus for Making Hollow Rubber Articles, of which the following is a full, clear, and exact description, reference being had to the accompanying drawings.

This invention relates to a process for manufacturing hollow rubber articles from sheet stock by the aid of suction drawing the stock into mold cavities. The object is to simplify and cheapen prior processes and enable an increased production.

The characteristics of the invention will be apparent from the following more detailed description in connection with the drawings illustrating certain apparatus which may be employed, and illustrating also the material in various stages.

Figure 1:
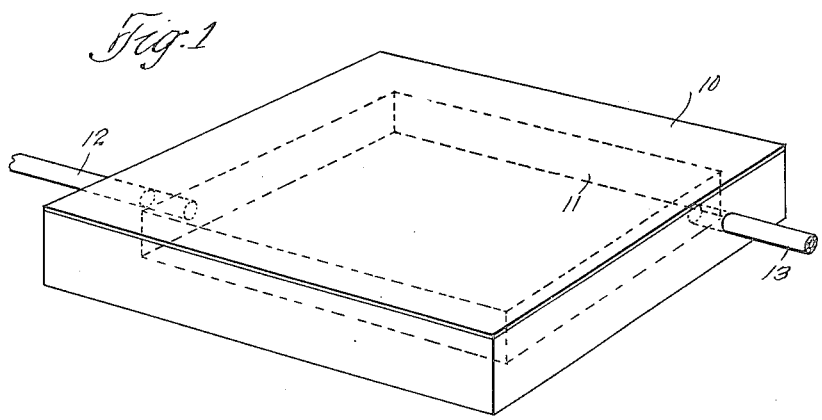
Figure 2:
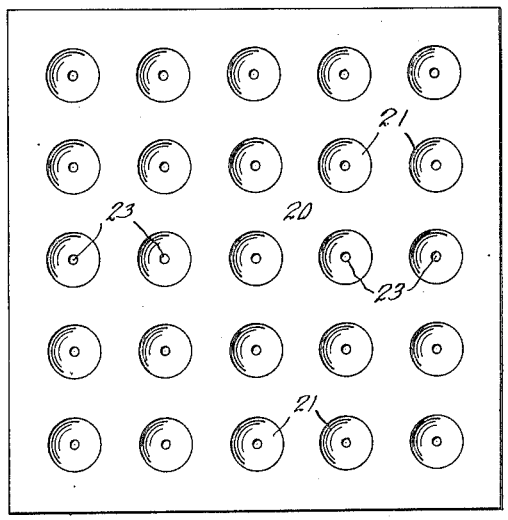
Figure 3:
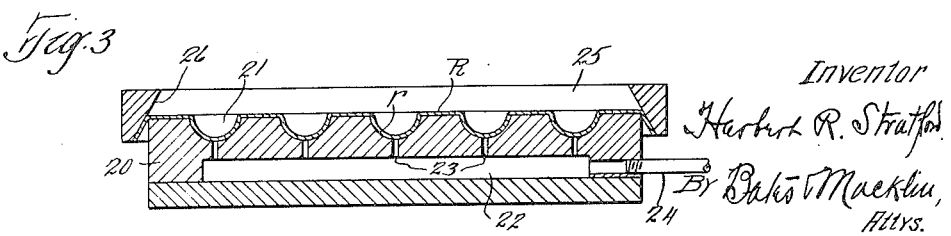

In the drawings Fig. 1 is the perspective view of a warming plate for softening the sheet stock; Fig. 2 is a plan of a suction mold specifically arranged for making balls; Fig. 3 is a cross section of the mold, showing also a clamping frame and sheet rubber stock held by the frame and seated by suction; Fig. 4 is a plan of a sheet of rubber after being treated in the mold; Fig. 5 is a cross section of the sheet shown in Fig. 4; Fig. 6 is a cross section of a pair of coacting seaming and shearing molds showing stock seated therein; Fig. 7 is a cross section of a ball as formed by the molds of Figs. 3 and 6, before vulcanization; Fig. 8 is a cross section of a vulcanizing mold for finishing the balls.

The first piece of apparatus used in my process is a warming plate having a surface on which the sheet of stock may be laid and means for heating such surface; Fig. 1 illustrates such a warming plate, consisting of a block of metal 10 having an internal chamber 11 with which communicate steam pipes 12 and 13 whereby the surface may be kept at the desired temperature which is sufficient to soften the stock without curing it.

The second piece of apparatus used is illustrated in Figs. 2 and 3 and comprises a mold plate 20 having cavities 21 formed according to the contour of the article to be made. In this plate is a chamber 22 communicating with the cavities by passage ways 23. A suction pipe 24 communicates with the chamber. 25 indicates a suitable rectangular frame having an inclined inner edge 26 and adapted to seat over the mold and clamp rubber stock thereon.

A rectangular sheet of rubber is first placed on the warming plate 10 and when somewhat softened is transferred immediately to the mold 20. The clamping frame 25 is then laid over the stock, the weight of the frame clamping the sheet around the edges of the mold. Then suction is applied to pipe 24, which draws the softened stock down into the mold cavities. The sheet of rubber thus takes the form shown at large R Fig. 3.

The seating of the stock against the comparatively cold cavity walls cools it, but it may be allowed to remain in the cavities for a short space of time while it is held by the vacuum, thus further cooling it in its distended form. Then the suction is released, the clamping ring removed, and the sheet of rubber stock removed from the mold and set aside. The sheet now has formed in it protuberances *r* corresponding to the form of the cavities 21. These protuberances tend to flatten, and in the course of time would disappear, but I have found that by giving the preliminary warming to the stock before the protuberances are formed and stretching the stock into shape while warm, and then allowing it to cool the rubber obtains a "set" for a longer period than otherwise and the protuberances remain in the sheet for a considerable time, for example, an hour.

After a number of rubber sheets, as illustrated in Figs. 4 and 5 and having the protuberances *r*, are formed, I place two of such sheets on the faces of two mold members 30, each having annular cutting edges 31 about the rims of the cavities. I place a small amount of heat expanding substance, as ammonia powder or water, in each of the rubber lined cavities of the lower mold members and I preferably put rubber cement on the edge portions of the stock seated in each of the mold members. I then bring the two mold members together in the form shown in Fig. 6 and force them into intimate contact by suitable pressure. This produces an annular seam about the article where the parts are joined and at the same time shears off the surrounding stock; Fig. 6 shows the stock seated and sheared by this operation, though in practice, very frequently the article portions will not seat tight against the cavity walls.

When the mold members 30 are separated, the articles, balls in this case, are formed and sheared from the rest of the stock, and when removed present the appearance illustrated in cross section in Fig. 7, though the walls may not be so regularly and distended as they are shown. I now take these formed balls and place them in a vulcanizing mold comprising two members 40 illustrated in Fig. 8, each member having a hemispherical cavity or cavities. The articles when placed in this vulcanizing mold having their seams out of registration with the plane dividing the molds as illustrated by the seams $r$ in Fig. 8. When the mold members are held together and are submitted to heat the expanding substance within the balls provides a pressure which seats them firmly against the walls, thus causing them to be vulcanized as perfect spheres. The vent 41 is large enough to allow the escape of air from the cavity but small enough so that the rubber will not materially pass into it.

It will be seen that my process is simple, and may be carried out rapidly and cheaply, and with inexpensive apparatus. The simplicity of the operation enables cheap labor to be used.

I claim:

1. The process of making hollow rubber articles comprising drawing a sheet by suction into a mold cavity to produce a protuberance thereon, removing said sheet, thereafter joining said sheets to another sheet and at the same time shearing both sheets off around the edge of the protuberance and thereafter vulcanizing the joined article.

2. The method of making a hollow rubber article comprising seating sheet stock by suction in a mold cavity, similarly treating another sheet of stock, removing said sheets from these molds and thereafter bringing the two sheets together, and shearing both sheets around the protuberances formed therein.

3. The method of making a hollow rubber article comprising forming sheet stock by suction in a mold cavity, similarly treating another sheet of stock, removing said sheets from these molds and thereafter bringing the two sheets together and shearing both sheets around the protuberances therein, then placing the article in a vulcanizing mold and vulcanizing it.

4. The method of making hollow rubber articles comprising successively forming sheets of rubber stock with protuberances therein, by subjecting the sheet to suction in a cavitary mold, the sheet being removed from the mold when the protuberance is formed, thereafter, before the protuberance has time to disappear, bringing such sheet into joining engagement with another sheet and shearing off the stock around the formed articles.

5. The method of making hollow rubber articles comprising successively forming sheets of rubber stock with protuberances therein, by subjecting the sheet to suction in a cavitary mold, the sheet being removed from the mold when the protuberances are formed, thereafter, before the protuberances have time to disappear, bringing two of such sheets together and shearing off the stock around the formed articles.

6. The method of making hollow rubber articles, comprising successively subjecting sheets of raw rubber to the action of suction in a cavitary mold to form protuberances therein, the removing of such sheets from the molds, then, before the protuberances have flattened out, taking two of such sheets and placing them in molds having annular cutting edges, and bringing such molds together to form an edge seam and shear off the surrounding stock.

7. The method of making hollow rubber articles, comprising successively subjecting sheets of raw rubber to an action of suction in a cavitary mold to form protuberances therein, then removing such sheets from the molds, then, before the protuberances have flattened out, taking two of such sheets and placing them in molds having annular cutting edges, placing expansible material in the depressions of one of the sheets to bring the sheets together to form an edge seam, and at the same time shear off the surrounding stock, then removing the formed articles and transferring them to the vulcanizing mold to vulcanize them.

8. The method of making hollow rubber articles comprising successively forming sheets by clamping them across a cavitary mold, to which suction is applied, and then taking two of such formed sheets and placing them in other molds having annular cutting edges and bringing two of such molds and sheets together to simultaneously form a seam and cut off the surplus stock about the article.

9. The process of making hollow rubber articles, consisting of successively clamping sheets of rubber stock across the face of a cavitary mold and applying suction to the cavity to seat the stock, then after a number of such sheets have been produced and removed, taking two of them and placing them in the cavities of other molds, which latter cavities have surrounding annular cutting edges, placing an expansible substance in the cavities in one of the molds, bringing the molds together to join the rubber and shear off the surplus stock, then removing the article, transferring it to an embracing vulcanizing mold and vulcanizing it therein.

10. The process of making hollow rubber articles consisting of clamping a sheet of stock across a mold having a plurality of cavities, applying suction to such cavities to seat the stock, removing the sheet, forming another sheet in the same manner, each sheet having a plurality of protuberances thereon, placing such two sheets in other molds each formed with cavities to receive the protuberances and having annular cutting edges individually surrounding each cavity, bringing such mold members together to join articles and cut off the surplus stock, then transferring the joined articles to a vulcanizing mold and vulcanizing them.

11. The method of making hollow rubber articles involving the employment of a mold having a series of cavities therein, consisting of successively placing sheets of stock across the face of the mold and applying suction to the mold to form a set of protuberances in the rubber sheet, removing each sheet from the mold when thus formed, placing two sheets before the protuberances have become flat in a pair of coacting molds which have cavities each individually surrounded by an annular cutting edge, and bringing such molds together under pressure to join the articles and shear them off around each article.

12. The method of making hollow rubber articles involving the employment of a mold having a series of cavities therein, consisting of successively placing sheets of stock across the face of the mold and applying suction to the mold to form a set of protuberances in the rubber sheet, removing each sheet from the mold when thus formed, placing two sheets before the protuberances have become flat in a pair of cavitary molds which have their cavities surrounded by annular cutting edges, placing heat-expanding material in the depressions of one of the sheets in one of such molds, bringing such molds together under pressure to join the articles and shear them off around each article, then transferring the articles to a vulcanizing mold and vulcanizing it therein.

13. The method of making hollow rubber articles, comprising successively warming sheets of rubber, and seating portions thereof by suction in a cavitary mold, the cooling of the sheet tending to set the formed protuberances, then, after a number of such sheets have been produced, taking two of them and placing them in other molds having cavities with surrounding cutting edges and bringing the latter molds together to join the article and shear off the surplus stock.

14. The process of making hollow rubber articles consisting of warming a sheet of rubber, seating it by suction in a cavitary mold, allowing it to cool somewhat to effect a setting of the formed part, removing the sheet from the mold, joining such formed part with other rubber stock in a mold which simultaneously forms a seam and shears the stock, and thereafter vulcanizing the article.

15. The method of making hollow rubber articles consisting of warming a sheet of rubber stock, placing it across the face of a mold having cavities, applying suction to such cavities to seat the stock therein, allowing the seated stock to cool, removing it from the mold, similarly treating another sheet of stock, bringing two of such treated sheets together face to face and pressing them together adjacent to the rims of the protuberances and at the same time shearing off the stock around such rims, then transferring the formed articles to a vulcanizing mold and vulcanizing them.

16. The method of making a hollow rubber article comprising forming sheet stock by suction in a mold cavity, similarly treating another sheet of stock, removing said sheets from these molds and thereafter bringing the two sheets together, and at the same time shearing both sheets around the protuberances therein, and then transferring the article to a vulcanizing mold and vulcanizing it.

17. An apparatus for making hollow rubber articles comprising a cavitary mold and means for clamping the stock at the external edges of such mold, said means consisting of a ring resting by gravity on the mold, the inner edge of the ring and the outer edge of the mold coacting to bind the stock between them and one of such edges being inclined in the direction to require only approximate registration in putting the ring in place, and a passageway in the mold adapted for the application of suction to the cavity or cavities of the mold.

18. In an apparatus for carrying out the process described, the embodiment of a mold having a series of cavities and a clamping frame having an inclined inner edge and adapted to rest by gravity on the external edges of the mold.

In testimony whereof I hereunto affix my signature.

HERBERT R. STRATFORD.